United States Patent
Flordelis et al.

(10) Patent No.: US 12,250,056 B2
(45) Date of Patent: Mar. 11, 2025

(54) REPETITIVE TRANSMISSIONS AND RE-CONFIGURABLE REFLECTIVE DEVICES

(71) Applicant: Sony Group Corporation, Tokyo (JP)

(72) Inventors: Jose Flordelis, Lund (SE); Erik Bengtsson, Eslöv (SE); Olof Zander, Södra Sandby (SE); Kun Zhao, Malmö (SE); Fredrik Rusek, Eslöv (SE)

(73) Assignee: Sony Group Corporation, Tokyo (JP)

( * ) Notice: Subject to any disclaimer, the term of this patent is extended or adjusted under 35 U.S.C. 154(b) by 324 days.

(21) Appl. No.: 17/908,201

(22) PCT Filed: Mar. 29, 2021

(86) PCT No.: PCT/EP2021/058196
§ 371 (c)(1),
(2) Date: Aug. 30, 2022

(87) PCT Pub. No.: WO2021/198202
PCT Pub. Date: Oct. 7, 2021

(65) Prior Publication Data
US 2023/0104494 A1  Apr. 6, 2023

(30) Foreign Application Priority Data
Mar. 31, 2020  (SE) ................... 2030112-3

(51) Int. Cl.
*H04B 7/15* (2006.01)
*H04B 3/36* (2006.01)
(Continued)

(52) U.S. Cl.
CPC ........... *H04B 7/145* (2013.01); *H04B 7/0408* (2013.01)

(58) Field of Classification Search
None
See application file for complete search history.

(56) References Cited

U.S. PATENT DOCUMENTS

| | | | |
|---|---|---|---|
| 7,664,093 B2 * | 2/2010 | Miyanaga | H04L 1/1887 370/347 |
| 8,050,620 B2 * | 11/2011 | Miyanaga | H04B 7/026 455/7 |

(Continued)

FOREIGN PATENT DOCUMENTS

| | | |
|---|---|---|
| WO | 2020254030 A1 | 12/2020 |
| WO | 2020254031 A1 | 12/2020 |

OTHER PUBLICATIONS

International Search Report and Written Opinion from corresponding International Application No. PCT/EP2021/058196, mailed on Aug. 18, 2021; 22 pages.

(Continued)

*Primary Examiner* — Tuan A Tran
(74) *Attorney, Agent, or Firm* — Tucker Ellis LLP

(57) ABSTRACT

A method of operating a transmitter node (101) configured to communicate with one or more receiver nodes (102-104) using a re-configurable reflective device. RRD (109), is provided. The RRD (109) is re-configurable to provide multiple spatial filters, each one of the multiple spatial filters being associated with a respective spatial direction (351-353) into which incident signals are selectively reflected by the RRD (109). The method includes repeatedly transmitting reference signals (198) towards the RRD (109) at one or more transmit periods (551-554). The method also includes setting the one or more transmit periods (551-554) based on a re-configuration timing (510) of the RRD (109), the re-configuration timing (510) defining a dwell time (511-513) of the RRD (109) for providing each one of the multiple spatial filters, to thereby counteract a change of one or more receive periods (531) of the reference signals (198) at at least one receiver node (102) of the one or more (Continued)

receiver nodes (102-104) caused by the re-configuration timing (510).

19 Claims, 11 Drawing Sheets

(51) Int. Cl.
  *H04B 7/0408* (2017.01)
  *H04B 7/14* (2006.01)
  *H04B 7/145* (2006.01)

(56) References Cited

U.S. PATENT DOCUMENTS

| | | | | |
|---|---|---|---|---|
| 8,218,461 | B2* | 7/2012 | Chang | H04B 7/2606 370/279 |
| 8,542,628 | B2* | 9/2013 | Chang | H04B 7/2606 370/324 |
| 8,649,317 | B2* | 2/2014 | Horiuchi | H04B 7/2606 370/315 |
| 8,693,385 | B2* | 4/2014 | Baba | H04B 7/155 370/328 |
| 8,705,433 | B2* | 4/2014 | Nakasato | H04L 5/0037 370/315 |
| 8,744,340 | B2* | 6/2014 | Palanki | H04W 56/001 455/7 |
| 10,687,304 | B2* | 6/2020 | Uchiyama | H04W 68/12 |
| 12,028,830 | B2* | 7/2024 | Uchiyama | H04W 92/18 |
| 2008/0045145 | A1* | 2/2008 | Nakatsugawa | H04B 7/155 455/11.1 |
| 2010/0135177 | A1* | 6/2010 | Liu | H04L 5/0023 370/252 |
| 2016/0219578 | A1 | 7/2016 | Lim | |

OTHER PUBLICATIONS

Qingqing Wu et al., "Intelligent Reflecting Surface Enhanced Wireless Network via Joint Active and Passive Beamforming", IEEE Transactions on Wireless Communications, vol. 18, No. 11, Nov. 2019, 16 pages.

Yifei Yang et al., "Intelligent Reflecting Surface Meets OFDM: Protocol Design and Rate Maximization", IEEE Transactions and Wireless Communications, vol. 68, No. 7, Jul. 2020, 14 pages.

Office Action and Search Report from corresponding Swedish Application No. 2030112-3, mailed on Feb. 8, 2021, 10 pages.

Ertugrul Basar et al., "Wireless Communications Through Reconfigurable Intelligent Surfaces", IEEE, Sep. 3, 2019, 21 pages.

Qingqing Wu et al., "Beamforming Optimization for Wireless Network Aided by Intelligent Reflecting Surface With Discrete Phase Shifts", IEEE Transactions on Communications, vol. 68, No. 3, Mar. 2020, 14 pages.

Abdelrahman Taha et al., "Enabling Large Intelligent Surfaces with Compressive Sensing and Deep Learning", Apr. 30, 2019, 33 pages.

Sha Hu et al., "Beyond Massive MIMO: The Potential of Data Transmission with Large Intelligent Surfaces", IEEE Transactions on Signal Processing, vol. 66, No. 10, May 15, 2018, 13 pages.

* cited by examiner

REPETITIVE TRANSMISSIONS AND RE-CONFIGURABLE REFLECTIVE DEVICES

TECHNICAL FIELD

Various examples generally relate to communicating between nodes using a re-configurable reflective devices. Various examples specifically relate to repeatedly transmitting reference signals towards the re-configurable reflective devices.

BACKGROUND

In order to increase a coverage area for wireless communication, it is envisioned to use re-configurable reflective devices (RRD), sometimes also referred to as reflecting large intelligent surface (LIS). See, e.g., Hu, Sha, Fredrik Rusek, and Ove Edfors. "Beyond massive MIMO: The potential of data transmission with large intelligent surfaces." *IEEE Transactions on Signal Processing* 66.10 (2018): 2746-2758.

An RRDcan be implemented by an array of antennas that can reflect incident electromagnetic waves/signals. The array of antennas can be semi-passive. Semi-passive can correspond to a scenario in which the antennas do not provide signal amplification, but can impose a variable phase shift. A corresponding spatial direction into which the incident signals are reflected can be re-configured, by changing a phase relationship between the antennas. A respective re-configuration timing defines a dwell time of the RRD in each respective spatial filter, wherein each spatial filter is associated with a spatial direction into which incident signals are then selectively reflected. For example, a longer re-configuration timing can correspond to a longer dwell time for each spatial filter.

It has been observed that due to the re-configuration timing repeated transmission of signals to receiver nodes via the RRD can sometimes be impaired.

SUMMARY

Accordingly, there is a need of improved techniques of repeatedly transmitting signals from a transmitter node to a receiver node via a RRD.

This need is met by the features of the independent claims. The features of the dependent claims define embodiments.

A method of operating a transmitter node is provided. The transmitter node is configured to communicate with one or more receiver nodes using a re-configurable reflective device. The re-configurable reflective device is re-configurable to provide multiple spatial filters. Each one of the multiple spatial filters is associated with a respective spatial direction into which incident signals are selectively reflected by the re-configurable reflective device. The method includes repeatedly transmitting reference signals towards the re-configurable reflective device at one or more transmit periods. The method further includes setting the one or more transmit periods based on a re-configuration timing of the re-configurable reflective device. The re-configuration timing defines a dwell time of the re-configurable reflective device for providing each one of the multiple spatial filters, to thereby counteract a change of one or more receive periods of the reference signals at at least one receiver node of the one or more receiver nodes caused by the re-configuration timing.

A computer program or a computer-program product or a computer readable storage medium or a digital signal includes program code. The program code can be loaded by at least one processor. The at least one processor can execute the program code. Upon executing the program code, the at least one processor performs a method of operating a transmitter node. The transmitter node is configured to communicate with one or more receiver nodes using a re-configurable reflective device. The re-configurable reflective device is re-configurable to provide multiple spatial filters. Each one of the multiple spatial filters is associated with a respective spatial direction into which incident signals are selectively reflected by the re-configurable reflective device. The method includes repeatedly transmitting reference signals towards the re-configurable reflective device at one or more transmit periods. The method further includes setting the one or more transmit periods based on a re-configuration timing of the re-configurable reflective device. The re-configuration timing defines a dwell time of the re-configurable reflective device for providing each one of the multiple spatial filters, to thereby counteract a change of one or more receive periods of the reference signals at at least one receiver node of the one or more receiver nodes caused by the re-configuration timing.

A transmitter node is configured to communicate with one or more receiver nodes using an RRD. The RRD is re-configurable to provide multiple spatial filters, each one of the multiple spatial filters being associated with a respective spatial direction into which incident signals are selectively reflected by the RRD. The transmitter node comprises control circuitry configured to repeatedly transmit reference signals towards the RRD at one or more transmit periods. The control circuitry is also configured to set the one or more transmit periods based on a re-configuration timing of the RRD, the re-configuration timing defining a dwell time of the RRD for providing each one of the multiple spatial filters, to thereby counteract a change of one or more receive periods of the reference signals at at least one receiver node of the one or more receiver nodes caused by the re-configuration timing.

A method of operating a receiver node is provided. The receiver node is served by a transmitter node via an RRD. The RRD is re-configurable to provide multiple spatial filters. Each one of the multiple spatial filters is associated with a respective spatial direction into which incident signals are reflected by the RRD. The method includes obtaining information indicative of a re-configuration timing of the RRD for switching between the multiple spatial filters. The method also includes obtaining information indicative of one or more transmit periods of reference signals that are repeatedly transmitted by the transmitter node. The method further includes estimating a channel quality based on monitoring for the reference signals and based on one or more receive periods of the reference signals. The one or more receive periods of the reference signals are determined based on the one or more transmit periods and the re-configuration timing.

A computer program or a computer-program product or a computer readable storage medium or a digital signal includes program code. The program code can be loaded by at least one processor. The at least one processor can execute the program code. Upon executing the program code, the at least one processor performs a method of operating a receiver node. The receiver node is served by a transmitter node via a reconfigurable reflective device. The reconfigurable reflective device is reconfigurable to provide multiple spatial filters. Each one of the multiple spatial filters is associated with a respective spatial direction into which incident signals are reflected by the reconfigurable reflective device. The method also includes obtaining information indicative of one or more receive periods of reference signals from the transmitter node. The one or more receive periods of the reference signals are determined based on one or more transmit periods at which the transmitter node repeatedly transmits reference signals and further based on a reconfiguration timing for the reconfigurable reflective device for switching between the multiple spatial filters. Also, the method includes estimating a channel quality based on monitoring for the reference signals and, furthermore, based on the one or more receive periods.

A receiver node is configured to be served by a transmitter node via a re-configurable reflective device, RRD. The RRD is re-configurable to provide multiple spatial filters, each one of the multiple spatial filters being associated with a respective spatial direction into which incident signals are reflected by the RRD. The receiver node includes control circuitry configured to obtain information indicative of a re-configuration timing of the RRD for switching between the multiple spatial filters. The control circuitry is also configured to obtain information indicative of one or more transmit periods of reference signals repeatedly transmitted by the transmitter node. The control circuitry is further configured to estimate a channel quality based on monitoring for the reference signals and based on one or more receive periods of the reference signals, the one or more receive periods of the reference signals being determined based on the one or more transmit periods and the re-configuration timing.

A method of operating a receiver node is provided. The receiver node is served by a transmitter node via a reconfigurable reflective device. The reconfigurable reflective device is reconfigurable to provide multiple spatial filters. Each one of the multiple spatial filters is associated with a respective spatial direction into which incident signals are reflected by the reconfigurable reflective device. The method also includes obtaining information indicative of one or more receive periods of reference signals from the transmitter node. The one or more receive periods of the reference signals are determined based on one or more transmit periods at which the transmitter node repeatedly transmits reference signals and further based on a reconfiguration timing for the reconfigurable reflective device for switching between the multiple spatial filters. Also, the method includes estimating a channel quality based on monitoring for the reference signals and, furthermore, based on the one or more receive periods.

A computer program or a computer-program product or a computer readable storage medium or a digital signal includes program code. The program code can be loaded by at least one processor. The at least one processor can execute the program code. Upon executing the program code, the at least one processor performs a method of operating a receiver node. The receiver node is served by a transmitter node via a reconfigurable reflective device. The reconfigurable reflective device is reconfigurable to provide multiple spatial filters. Each one of the multiple spatial filters is associated with a respective spatial direction into which incident signals are reflected by the reconfigurable reflective device. The method also includes obtaining information indicative of one or more receive periods of reference signals from the transmitter node. The one or more receive periods of the reference signals are determined based on one or more transmit periods at which the transmitter node repeatedly transmits reference signals and further based on a reconfiguration timing for the reconfigurable reflective device for switching between the multiple spatial filters. Also, the method includes estimating a channel quality based on monitoring for the reference signals and, furthermore, based on the one or more receive periods.

A receiver node is configured to be served by a transmitter node via a re-configurable reflective device, RRD. The RRD is re-configurable to provide multiple spatial filters, each one of the multiple spatial filters being associated with a respective spatial direction into which incident signals are reflected by the RRD. The receiver node includes control circuitry configured to obtain information indicative of one or more receive periods of reference signals from the transmitter node, the one or more receive periods of the reference signals being determined based on one or more transmit periods at which the transmitter node repeatedly transmits the reference signals and further based on a re-configuration timing of the RRD for switching between the multiple spatial filters. The control circuitry is further configured to estimate a channel quality based on monitoring for the reference signals and based on the one or more receive periods.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
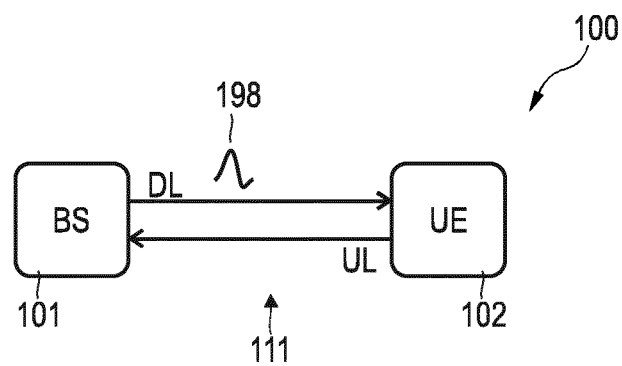
FIG. 1 schematically illustrates a communication system according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate wireless communication between nodes. A wireless communication system includes a transmitter node and one or more receiver nodes. In some examples, the wireless communication system can be implemented by a wireless communication network, e.g., a radio-access network (RAN) of a Third Generation Partnership Project (3GPP)-specified cellular network (NW). In such case, the transmitter node can be implemented by a base station (BS) of the RAN, and the one or more receiver nodes can be implemented by terminals (also referred to as user equipment, UE). It would also be possible that the transmitter node is implemented by a UE and the one or more receiver nodes are implemented by a BS and/or further UEs. Hereinafter, for sake of simplicity, various examples will be described with respect to an example implementation of the transmitter node by a BS and the one or more receiver node by UEs—i.e., to downlink (DL) communication; but the respective techniques can be applied to other scenarios, e.g., uplink (UL) communication and/or sidelink communication.

According to various examples, the transmitter node can communicate with at least one of the receiver nodes via an RRD.

The RRD may include an antenna array. The RRD may include a meta-material surface.

There are many school-of-thoughts for how RAAs should be integrated into 3GPP-standardized RANs. In an exemplary case, the NW operator has deployed the RAAs and is therefore in full control of the RRD operations. The UEs, on the other hand, may not be aware of the presence of any RRD, at least initially, i.e., it is transparent to a UE whether it communicates directly with the BS or via a RRD. The RRD essentially functions as a coverage-extender of the BS. The BS may have established a control link with the RRD.

In another exemplary case, it might be a private user or some public entity that deploys the RRD. Further, it is the UE that, in this case, controls RRD operations. The BS, on the other hand, is not aware of the presence of any RRD and, moreover, has no control over them whatsoever. The UE gains awareness of the presence of RRD by means of some short-range radio technology, such as Bluetooth of WiFi, by virtue of which it may establish the control link with the RRD.

The two exemplary cases described above are summarized in TAB. 1 below.

TABLE 1

Scenarios for RRD integration into cellular NW

Figure 5:
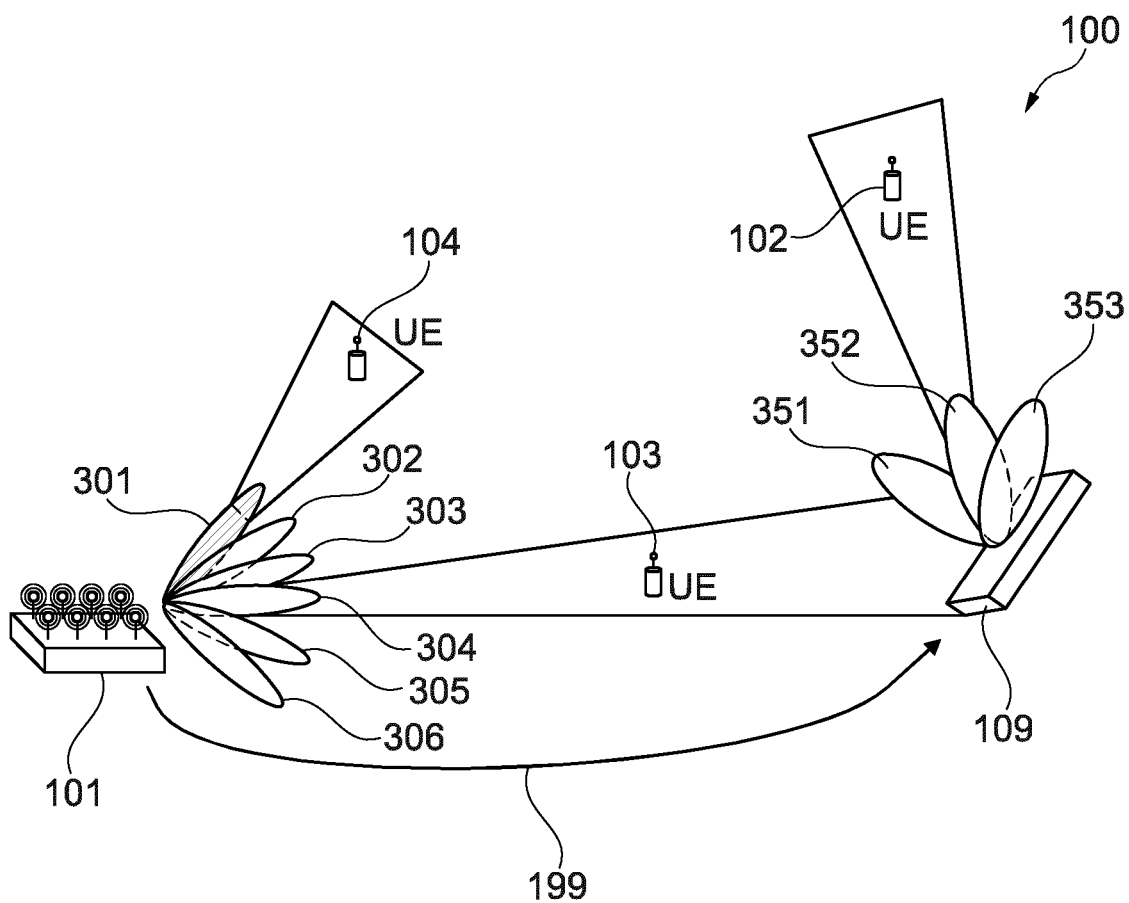
FIG. 5 schematically illustrates a deployment scenario of the RRD being controlled by a transmitter node of the communication system according to various examples.
Figure 6:
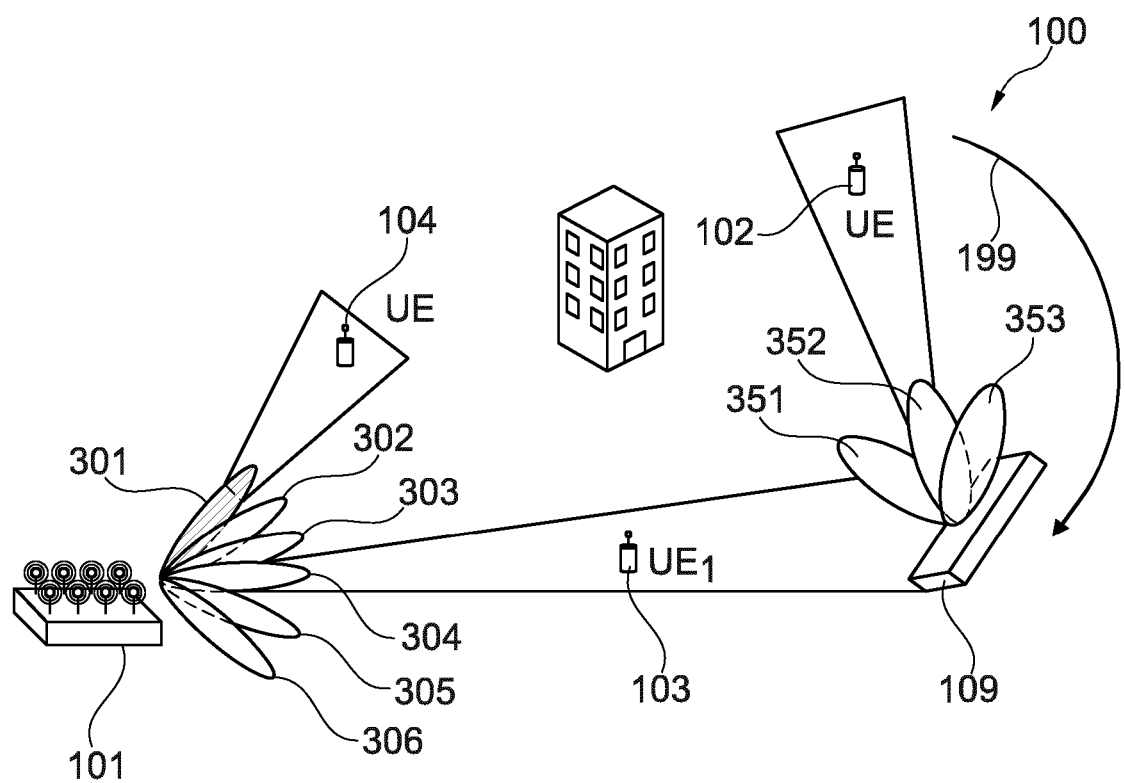
FIG. 6 schematically illustrates a deployment scenario of the RRD being controlled by a receiver node of the communication system according to various examples.

| Scenario | Description | Explanation |
| --- | --- | --- |
| A | BS-RRD control link | BS controls the RRD and/or can obtain information from the RRD. A control link is established between the BS and the RRD. CF. FIG. 5. |
| B | UE-RRD control link | UE controls the RRD and/or can obtain information from the RRD. A control link is established between the UE and the RRD. CF. FIG. 6. |

Hereinafter, techniques will be described which facilitate communication between a transmitter node—e.g., a BS—and one or more receiver nodes—e.g., one or more UEs using a RRD. The techniques are compatible with scenario A and B of TAB. 1.

More specifically, the techniques described herein can be used to facilitate communication of reference signals (RSs; sometimes also referred to as pilot signals or synchronization signals) that are repeatedly transmitted by the transmitter node. The RSs can have a predefined signal shape and/or symbol sequence. The RSs can have predefined transmit properties such as, e.g., transmit amplitude or phase, or even precoding. Thus, by using the RSs, the one or more receiver nodes can obtain information on the channel between the transmitter node and the respective one of the one or more receiver nodes (details with respect to various use cases of RSs will be discussed below in connection with TAB. 3). As a general rule, various kinds and types of RSs can be subject to the techniques described herein. For instance, RSs that are not associated with one or more specific UE's—e.g., a primary synchronization signal (PSS) or a secondary synchronization signal (SSS) broadcasted in a synchronization signal block (SSB)—can be subject to the techniques described herein. Alternatively or additionally, it would be possible to apply the techniques described herein to RSs that are associated with one or more specific UEs; an example would be a Channel State Information (CSI)-RS.

The RSs are repeatedly transmitted by the transmitter node. This means that the reference signals are transmitted at one or more transmit (TX) periods. For instance, there may be a single TX period, i.e., there is a single periodicity. However, they can also be multiple TX periods, e.g., pertaining to a macro-cycle and at least one micro-cycle per macro-cycle. Some examples are described below with respect to the scenario of a single periodicity, but similar techniques can be applied to scenarios where there are multiple periodicities, i.e., multiple TX periods. The TX periodicity is denoted as $T_{RS}$.

Various techniques are based on the finding that—due to a receiver node being served via a RRD—the one or more receive (RX) periods at the receiver node can differ from the one or more TX periods at the transmitter node. This is because the RRD is typically limited to sequential operation: at a given moment in time, the RRD can apply a single spatial filter, i.e., reflect incoming RSs into a single spatial direction. The RRD switches between the multiple spatial filters in accordance with a re-configuration timing, thereby toggling through the different spatial directions into which incoming RSs are reflected. The re-configuration timing defines the dwell time per spatial filter, i.e., defines how long a certain spatial filter is active before being deactivated in favor of a further spatial filter.

Throughout this document, a spatial filter of the RRD defines a spatial direction of a signal reflected by the RRD; meanwhile, the spatial direction of the incoming signal is assumed fixed. This scheme is well fitted to the DL of a communication link between a BS and a UE, in which case the BS is stationary, and the UE is, in general, mobile. However, the skilled reader will appreciate that the principles and methods explained herein can be readily applied to spatial filters defining one or more spatial directions of a signal incoming to the RRD, in combination with one (e.g., in the UL case) or several (e.g., in a sidelink case) spatial filters defining one or more spatial directions of a signal reflected by the RRD.

In the various examples described herein, two main strategies will be explained for facilitating communication between the transmitter node and at least one receiver node of the one or more receiver nodes, the at least one receiver node being served via the RRD. These two strategies are summarized in TAB. 2.

TABLE 2

Strategies for facilitating repetitive transmission of RSs via RRD.

| Strategy | Description | Explanation |
|---|---|---|
| A | Setting of the one or more TX periods | It is possible to set the one or more TX periods for repeatedly transmitting RSs at the BS based on the re-configuration timing of the RRD, to thereby counteract the change of the one or more RX periods of the RSs at at least one receiver node caused by the re-configuration timing. For this, the transmitter node can obtain a message indicative of the re-configuration timing, e.g., from the RRD and/or the at least one receiver node depending on whether scenario A or scenario B of TAB. 1 is present. For example, the message could be indicative of a count of the spatial filters being alternatingly activated by the RRD. |
| B | Obtaining information of one or more RX periods | It is possible to obtain, at at least one receiver node being served via the RRD, information indicative of the one or more RX periods that depend on, both, the one or more TX periods, as well as on the re-configuration timing. This information can be obtained from, e.g., the transmitter node and/or the RRD, e.g., depending on whether scenario A or scenario B of TAB. 1 is present. |

Strategies A and B of TAB. 2 can be combined with each other or used in isolation.

FIG. 1 schematically illustrates a communication system 100. The communication system includes two nodes 101, 102 that are configured to communicate with each other via a wireless link 114. In the example of FIG. 1, the node 101 is implemented by an access node, more specifically a BS, and the node 102 is implemented by a UE. The BS 101 can be part of a cellular NW (not shown in FIG. 1).

As a general rule, the techniques described herein could be used for various types of communication systems, e.g., also for peer-to-peer communication, etc. For sake of simplicity, however, hereinafter, various techniques will be described in the context of a communication system that is implemented by a BS 101 of a cellular NW and a UE 102.

As illustrated in FIG. 1, there can be DL communication, as well as UL communication. Various examples described herein particularly focus on the DL communication of RSs 198 that are repeatedly transmitted by the BS 101 to the UE 102. But similar techniques may be applied to, e.g., UL communication of RSs repeatedly transmitted by the UE 102 to the BS 101.

Figure 2:
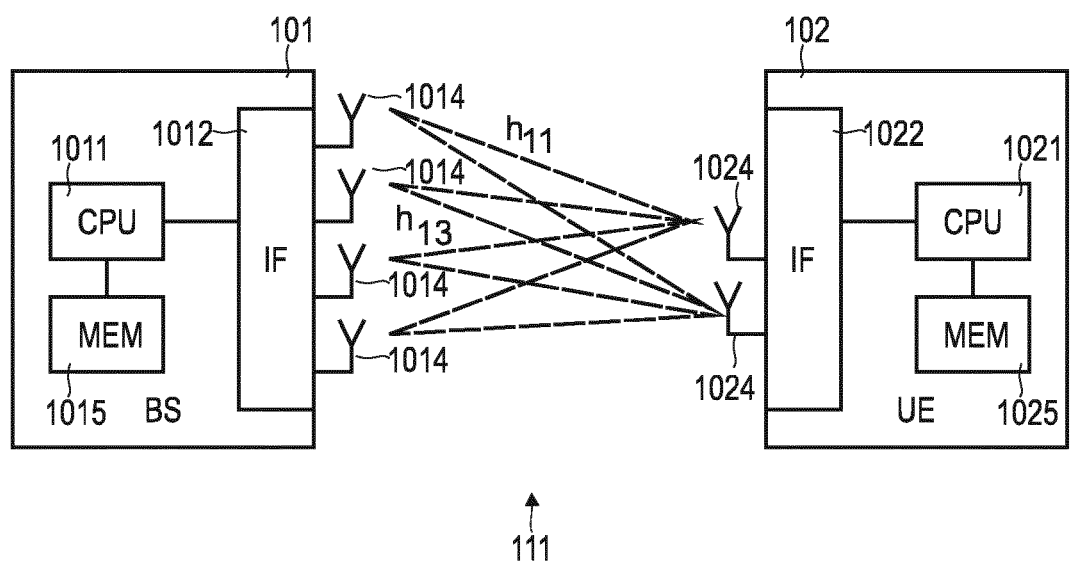
FIG. 2 schematically illustrates details of the communication system according to the example of FIG. 1.

FIG. 2 illustrates details with respect to the BS 101. The BS 101 includes control circuitry that is implemented by a processor 1011 and a non-volatile memory 1015. The processor 1011 can load program code that is stored in the memory 1015. The processor 1011 can then execute the program code. Executing the program code causes the processor to perform techniques as described herein, e.g.: repeatedly transmitting RSs 198 to one or more UEs; setting one or more transmit periods of said repeatedly transmitting of the RSs 198; obtaining information indicative of a re-configuration timing of a RRD; providing information indicative of one or more TX periods of said repeatedly transmitting of the RSs 198; providing information indicative of one or more RX periods of said repeatedly transmitting of the RSs 198; etc., FIG. 2 also illustrates details with respect to the UE 102. The UE 102 includes control circuitry that is implemented by a processor 1021 and a non-volatile memory 1025. The processor 1021 can load program code that is stored in the memory 1025. The processor can execute the program code. Executing the program code causes the processor to perform techniques as described herein, e.g.: attempting to receive (monitor for) RSs 198 repeatedly transmitted by the BS 101; estimating a channel quality based on said monitoring for the RSs 198; obtaining information indicative of the re-configuration timing of a RRD via which the UE 102 is being served, e.g., by lowering such information from a memory, receiving a message indicative of the re-configuration timing from the BS 101 and/or the RRD; obtaining information indicative of one or more transmit periods of the RSs 198 being repeatedly transmitted by the BS 101;

obtaining information indicative of one or more receive periods of the RSs 198 at the UE 102; etc.

FIG. 2 also illustrates details with respect to communication between the BS 101 and the UE 102 on the wireless link 114. The BS 101 includes an interface 1012 that can access and control multiple antennas 1014. Likewise, the UE 102 includes an interface 1022 that can access and control multiple antennas 1024.

While the scenario of FIG. 2 illustrates the antennas 1014 being coupled to the BS 101, as a general rule, it would be possible to employ transmit-receive points (TRPs) that are spaced apart from the BS.

The interfaces 1012, 1022 can each include one or more TX chains and one or more receiver chains. For instance, such RX chains can include low noise amplifiers, analogue to digital converters, mixers, etc. Analogue and/or digital beamforming would be possible.

Thereby, phase-coherent transmitting and/or receiving (communicating) can be implemented across the multiple antennas 1014, 1024. Thereby, the BS 101 and the UE 102 can selectively transmit on multiple TX beams (beamforming), to thereby direct energy into distinct spatial directions.

By using a TX beam, the direction of the wavefront of signals transmitted by a transmitter of the communication system is controlled. Energy is focused into a respective direction or even multiple directions, by phase-coherent superposition of the individual signals originating from each antenna 1014, 1024. Thereby, the spatial data stream can be directed. The spatial data streams transmitted on multiple beams can be independent, resulting in spatial multiplexing multi-antenna transmission; or dependent on each other, e.g., redundant, resulting in diversity multi-input multi-output (MIMO) transmission.

As a general rule, alternatively or additionally to such TX beams, it is possible to employ receive (RX) beams.

The concept of beams can be used in so-called beam-sweeps and burst transmission; details with respect to beams are explained next in connection with FIG. 3.

Figure 3:
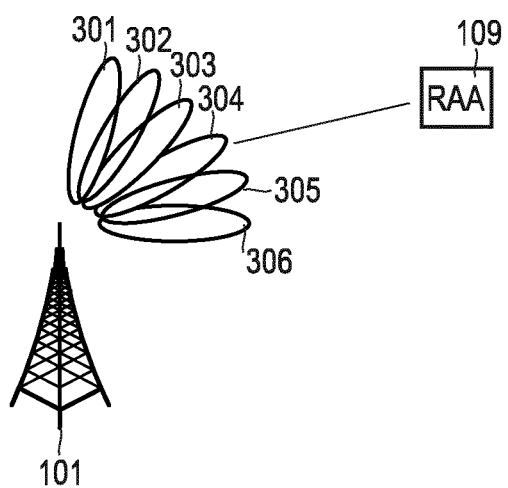
FIG. 3 schematically illustrates multiple downlink transmit beams used at a transmitter node of the communication system and further schematically illustrates a RRD towards which one of the multiple transmit beams is directed according to various examples.

FIG. 3 illustrates DL TX beams 301-306 used by the BS 101. Here, the BS 101 activates the beams 301-306 on different resources (e.g., different time-frequency resources, and/or using orthogonal codes/precoding) such that the UE 102 can monitor for respective signals transmitted on the DL TX beams 301-306.

A burst transmission transmits RSs or other signals on at least some of the DL TX beams 301-306. To this end, the burst transmission includes multiple transmission blocks, wherein each transmission block is associated with a respective DL TX beam 301-306. An example would be a SSB burst including multiple SSBs, each SSB including a PSS and SSS, wherein different SSBs are transmitted on different ones of the DL TX beams 301-306.

It is possible that the BS 101 transmits signals to the UE 102 via a RRD 109. In the scenario of FIG. 3, the downlink transmit beam 304 is directed towards the RRD 109. Thus, whenever the BS 101 transmits signals to the UE 102 using the downlink transmit beam 304—e.g., a respective block of a burst transmission—, a spatial filter is provided by the RRD 109. The spatial filter is associated with a respective spatial direction and to which the incident signals are then selectively reflected by the RRD 109. Details with respect to the RRD 109 are illustrated in connection with FIG. 4.

Figure 4:
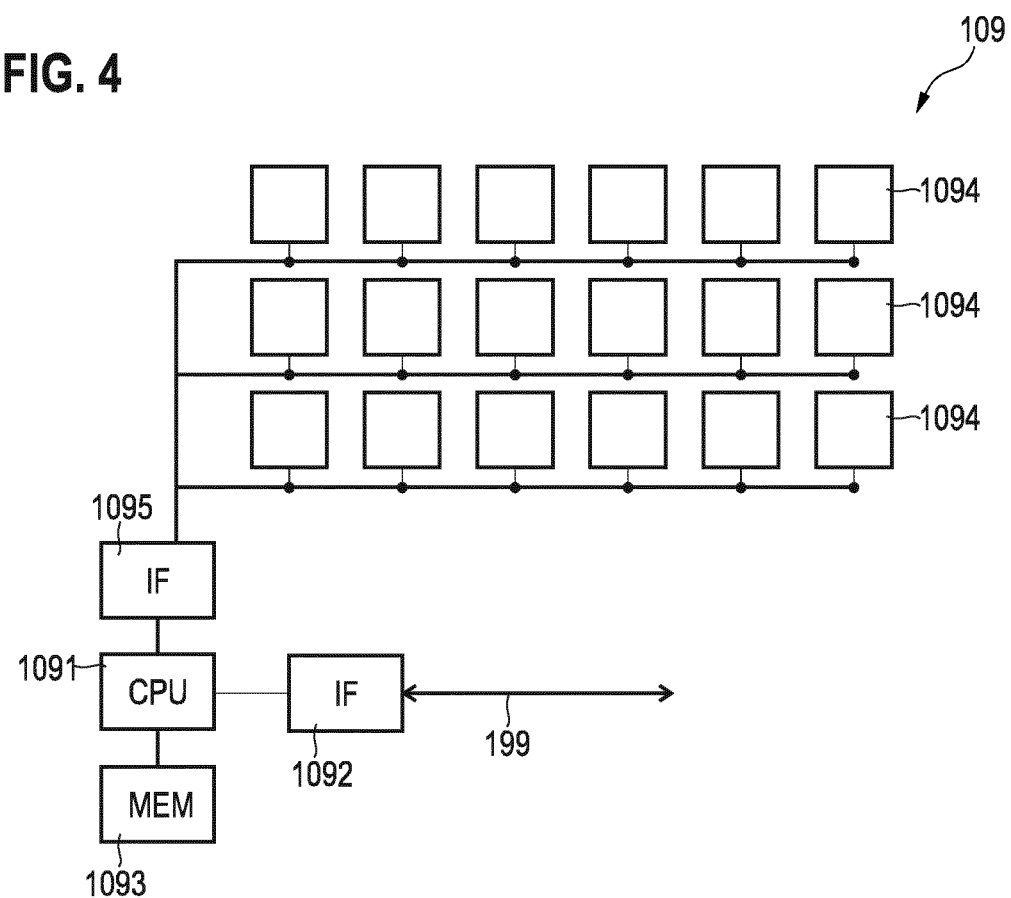
FIG. 4 schematically illustrates details with respect to the RRD.

FIG. 4 illustrates aspects in connection with the RRD 109. The RRD 109 includes a phased array of antennas 1094 that impose a configurable phase shift when reflecting incident signals. This defines respective spatial filters that are associated with spatial directions into which the incident signals are reflected. The antennas 1094 can be passive or semi-passive elements that do not provide any amplification. The RRD 109 thus provides coverage extension by reflection of radio-frequency (RF) signals. A translation to the baseband may not be required. This is different, to, e.g., decode-and-forward repeater or relay functionality.

The RRD 109 includes an antenna interface 1095; a processor 1091 can activate respective spatial filters one after another, e.g., in accordance with a re-configuration timing that defines the dwell time per spatial filter.

There is a communication interface 1092 and a control link 199 can be established between the RRD 109 and, e.g., the BS 101 and/or the UE 102 (cf. TAB. 1: scenario A or B). The re-configuration timing can be read and/or set via the control link 199. The count of spatial filters $N_{RAA}$ can be read and/or set via the control link 199.

The communication interface 1092 to establish the control link 199 is optional. In other scenarios, the control link 199 can be established in-band, i.e., via the antennas 1094. Then, there may be receiver including an analog frontend to convert to the baseband.

The control link 199 can be generally configured to be unidirectional towards the RRD 109.

There is a memory 1093 and the processor 1091 can load program code from the non-volatile memory and execute the program code. Executing the program code causes the processor to perform techniques as described herein, e.g.: providing information indicative of the count of spatial filters and/or the re-configuration timing via the control link 199.

FIG. 4 is only one example implementation of the RRD. Other implementations are conceivable. For example, a meta-material surface not including distinct antenna elements may be used. The meta-material can have a configurable refraction index. To provide re-configurable refraction index, the meta-material may be made of repetitive tunable structures that have extensions smaller than the wavelength of the incident RF signals.

FIG. 5 schematically illustrates aspects with respect to an implementation of the wireless communication system 100 including the BS 101 and multiple wireless communication devices 102-104. The scenario of FIG. 5 corresponds to the scenario A of TAB. 1: the control link 199 is established between the RRD 109 and the BS 101. The communication system 100 also includes the RRD 109.

The UE 104 is served via the DL TX beam 301, and the UEs 102 and 103 are served via the DL TX beam 304. Here, the UE 103 is not served via the RRD 109, but the UE 102 is served via the RRD 109.

FIG. 6 schematically illustrates aspects with respect to an implementation of the wireless communication system 100 including the BS 101 and multiple wireless communication devices 102-104, as well as the RRD 109. The scenario of FIG. 6 corresponds to the scenario B of TAB. 1: the control link 199 is established between the UE 102 and the RRD 109.

While in FIG. 5 and FIG. 6 the control link 199 is illustrated unidirectional, in other examples, the control link 199 can be bidirectional or may be unidirectional from the RRD 109 to the BS 101 or the UE 102, respectively. In some examples, it would even be possible that the control link 199 is established between the RRD 109 and the BS 101, as well as the UE 102 (combination of scenario A and B of TAB. 1).

In FIG. 5 and FIG. 6, the RRD 109 functions as a coverage-extender of the BS 101, combating pathlosses and signal blockage at millimeter wave frequencies.

Next, the functioning of the communication system 100 of FIG. 5 and FIG. 6 is explained. According to examples, the BS 101 can repeatedly transmit RSs 198 on the DL TX beam 304 directed towards the RRD 109 using one or more TX periods. For instance, there may be a respective TX periodicity specified, e.g., T=20 ms or up to T=160 ms is possible in 3GPP 5G NR according to current standardization; in the future, other periodicities are possible. The BS 101 can share the value T with the UEs 102-104, e.g., using a broadcast message. In FIG. 5 and FIG. 6, the UE 103 observes the RSs at a RX periodicity T* that is the same as the TX periodicity, i.e. T*=T. On the other hand, if the RRD 109 can only reflect towards one spatial direction 351-353 at the time, for the example scenario of FIG. 6, at least three transmissions on the DL TX beam 304 are needed in order for the RRD 109 to reflect in all spatial directions 351-353 (a typical count of spatial filters may of the RRD 109 be in the range of 10 to 100 in practical implementations). Thus, from the perspective of the UE 102, the RX periodicity of the repetitive transmission of the RSs is, e.g., $T_{RS}^*=3T_{RS}$. This is also illustrated in FIG. 7.

Figure 7:
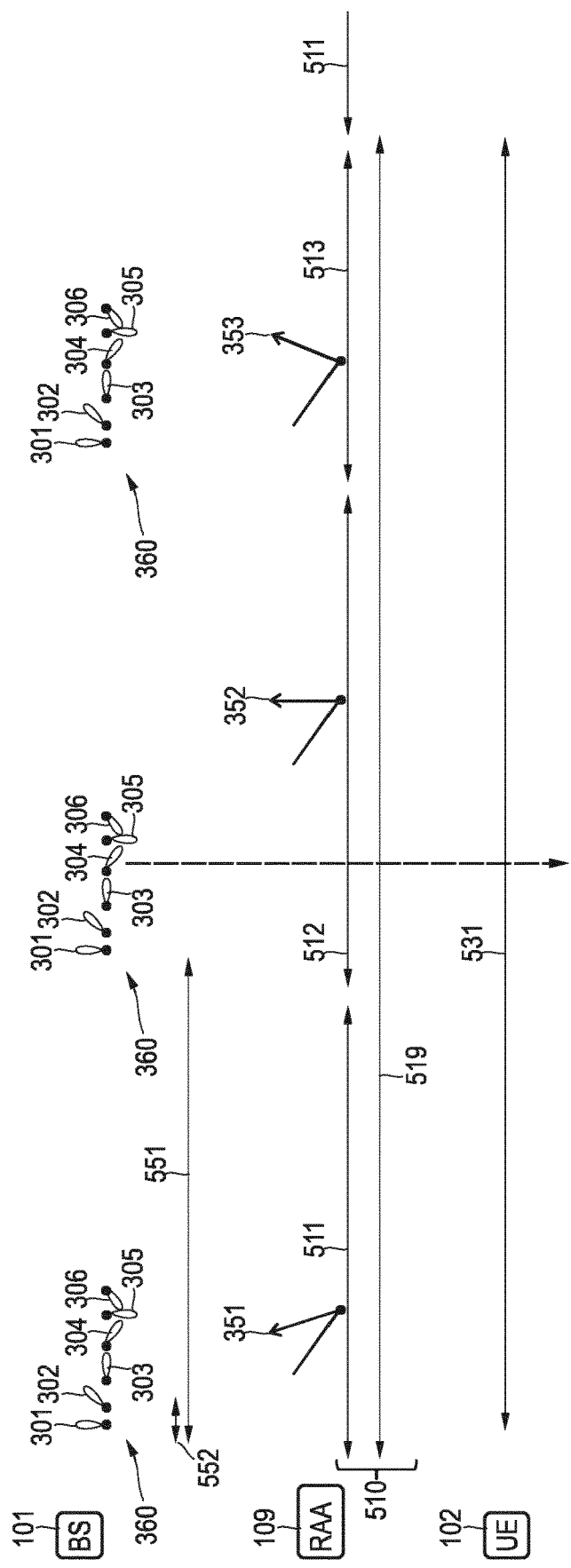
FIG. 7 schematically illustrates a time-domain behavior of one or more transmit periods of a repetitive transmission of reference signals, a re-configuration timing of the RRD, and one or more receive periods of the UE according to various examples.

FIG. 7 illustrates aspects with respect to repeatedly transmitting reference signals 198 by the base station 101. Illustrated in FIG. 7 are aspects with respect to a change of one or more receiver periods 531 at the UE 102 (that is served via the RRD 109) caused by a re-configuration timing 510 of the RRD 109.

The re-configuration timing 510 defines dwell times 511-513 of the RRD 109. Each dwell time 511-513 is associated with a respective spatial filter implemented at the RRD 109. For instance, during the dwell time 511, the spatial filter associated with the spatial direction 351 is active; during the dwell time 512, the spatial filter associated with the spatial direction 352 is active; and, during the dwell time 513, the spatial filter associated with the spatial direction 353 is active. The re-configuration timing 510 also specifies the cycle periodicity 519 after which the various spatial filters of the RRD 109 are activated anew.

FIG. 7 illustrates that the base station 101 repeatedly transmits reference signals 198 in respective burst transmissions 360 on the multiple DL TX beams 301-306. The respective TX periods 551, 552 are illustrated in FIG. 7: there is a micro-periodicity 552 within each burst transmission 360 and a macro-periodicity $T_{RS}$ 551. The RX period 531 $T_{RS}^*$ at the UE 102 is also illustrated: $T_{RS}^*=3T_{RS}$. As illustrated by the vertical dashed arrow, the UE 102 only receives the RS 198 during the dwell time 512 while the spatial filter associated with the spatial direction 352 is active (also cf. FIG. 5 and FIG. 6).

Thus, as will be appreciated from the above, where a RS is repeatedly transmitted towards the RRD 109 at one or more TX periods, the corresponding one or more RX periods of the RSs at a receiver node that is served via the RRD can change due to the re-configuration timing of the RRD.

It has been observed that such a change of the one or more RX periods due to the re-configuration timing can have an impact on the operation of the UE 102 according to reference implementations. At least three use cases for channel sounding based on RSs are conceivable that can be impacted by the one or more RX periods changing. These use cases are summarized in TAB. 3 below.

TABLE 3

Use cases for RSs, channel sounding

| Use case | Brief description | Details |
|---|---|---|
| 1 | RS for initial access | RSs can be used at the UE 102 for initial access, i.e., when attempting to transition to a connected mode with the cellular NW in which a data connection is established between the UE 102 and the BS 101. For instance, PSSs and SSSs are included in an SSB. When a UE prepares for the initial access, it attempts to find SSBs. Since the UE is unaware of the TX periodicity TssB of the SSBs (the periodicity can be decided/changed by the NW, e.g., semi-statically or sporadically) when activated, it is of lesser importance that the periodicity is increased if the UE observes an SSB signal reflected by a RRD. For example: If the TX periodicity is $T_{SSB}$ = 20 ms, then the UE 102 would observe a RX periodicity of T* = 60 ms (assuming that the re-configuration timing of the RRD 109 defines a dwell time on each spatial direction 351-353 of 20 ms; i.e., the re-configuration timing and the TX periodicity are synchronized), but this is irrelevant for the UE 102 since 60ms could very well have been what the BS 101 uses. However, for larger number of spatial directions 351-353 and/or longer dwell times, the RX periodicity T* becomes too large and the UE algorithms may fail to receive any SSB. It is important to understand that although the initial access will typically succeed, it enforces a periodic sweeping of the spatial directions 351-353 of the RRD carrying the SSB signals. This is at the root of the use cases 2 and 3 described next. |
| 2 | RS for measurement reporting | RSs - e.g., PSS and SSS included in SSBs - can be used for measurement reporting, i.e., beam management in dynamic scenarios. In particular, this can be the case when the UE operates in the connected mode, after initial access. The BS 101 may request the UE 102 to measure and report the received strengths of the RSs. As the value TX periodicity T has been shared with the UE 102, the one or more RX periods at which the UE monitors for RSs may be set accordingly. Yet, at a given RX period, the RRD 109 may reflect the RS using the spatial filter defining the spatial direction 353 (not directed towards the UE 102) and consequently the UE 102 reports a very low signal strength. |

TABLE 3-continued

Use cases for RSs, channel sounding

| Use case | Brief description | Details |
|---|---|---|
| | | However, if the BS 101 is aware of the current spatial filter of the RRD 109 (cf. TAB. 1, scenario A), the consequence may be, rather than reporting erroneous values, that the robustness against mobility is reduced due to the lower RX periodicity in the RRD 109 coverage area, in such a reference implementation. RRDRRD |
| 3 | RS for beam refinement | A third role RSs play is that the UE 102 performs RX beam refinement based on, e.g., receive amplitude and/or receive phase of the RSs. For such UE implementations, the beam refinement process gets deteriorated since the TX periodicity T shared by the BS 101 is not in agreement with the observed RX periodicity T* for the UE 102. Also, with awareness at the UE side, the robustness against mobility is reduced due to the lower RX periodicity T* in the coverage area of the RRD 109. |

Thus, as explained above, it is indeed a problem of reference implementations that some UEs may observe RSs at different RX periodicities, depending on whether they are served or not served via the RRD 109. This problem is, in fact, more general and may apply to other BS-UE procedures placing assumptions on the periodicity of the signaling between the BS and the UE, i.e., beyond RSs. In particular, problems also arise during measurements in connected mode for the deployment illustrated in FIG. 6, in which the UE 102 controls the reflecting RRD 109 (scenario B of TAB. 1). These can be summarized as follows:

TABLE 4

Problems arising from communication via RRD 109

Figure 8:
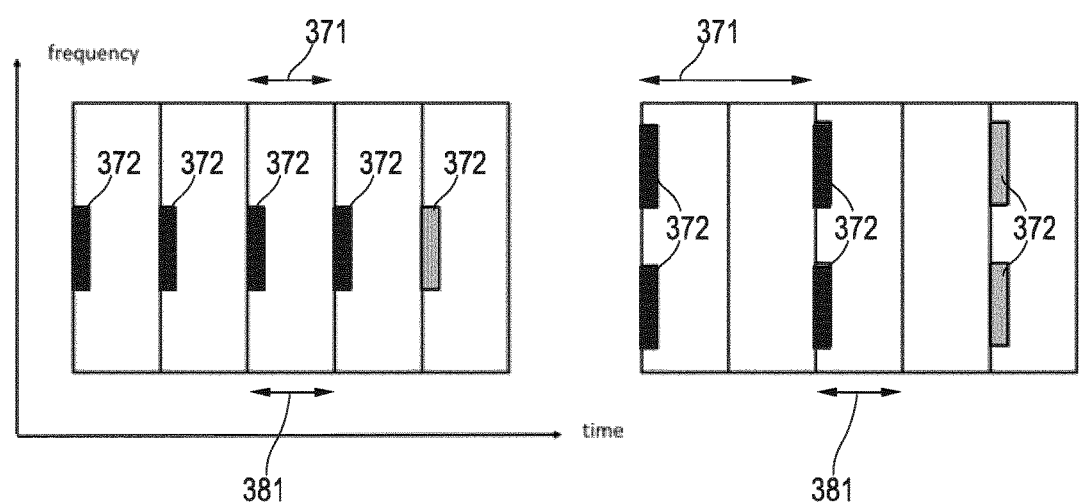
FIG. 8 schematically illustrates time-frequency resources of a time-frequency resource grid, the time-frequency resources being allocated to a repetitive transmission of reference signals according to various examples.

| | |
|---|---|
| Problem I: | Firstly, the BS 101 may not schedule DL RSs for the UE with a sufficient number of repetitions for measurement reporting and/or UE-Rx beam refinement based on DL RSs 198 (use cases 2 and 3 of TAB. 3). This is because the BS 101 - in reference implementations - can be unaware of an intervening RRD 109 capable of reflecting in NRRD directions (cf. TAB. 1: scenario B). In the example scenario of FIG. 6, the UE 102 is served by DL TX beam 304, but the BS 101 is unaware of the re-configuration timing between the spatial filters associated with the spatial directions 351-353 by the RRD 109. |
| Problem II: | Secondly, the BS 101 may schedule DL RSs for the UE 102 in a way that is not suitable for measurements with the RRD 109. This is so since the RRD 109 is capable of reflecting signals in only one direction 351-353 at a time. Therefore, repetitions of DL RSs 198 need to be separated in time, and not merely in the frequency domain. FIG. 8 schematically illustrates the difference between these two ways of configuration BS pilots. FIG. 8 schematically illustrates time-frequency resources 372 in a time-frequency resource grid allocated to DL RSs. FIG. 8 illustrates the TX periodicity 371. FIG. 8 illustrates time slots 381 of a timing protocol. The time-frequency resources 372 are separated at least by a symbol duration of the time-frequency resource grid in time domain. Further, FIG. 8 illustrates the scheduling of additional DL RSs for the UE 102 with dashed filling of the respective time-frequency resources 372, in addition to default RSs - e.g., beacons that are always on - that are illustrated with a full filling. |

In the example of FIG. 8, the DL RSs are arranged at time-frequency resource elements at the beginning of the time slots 381. As such, the DL RSs can be labeled front-loaded DL RSs. Thereby, necessary management of the spatial filters of the RRD 109 can take places before payload data transmissions.

Above drawbacks of reference implementations for repeatedly transmitting RSs 198 using the RRD 109 have been described. According to the techniques described herein, such drawbacks can be mitigated. Hereinafter, techniques will be described that facilitate efficient communication of signals, in particular repetitive transmission of signals, in the scenario A and the scenario B of TAB. 1

Figure 9:
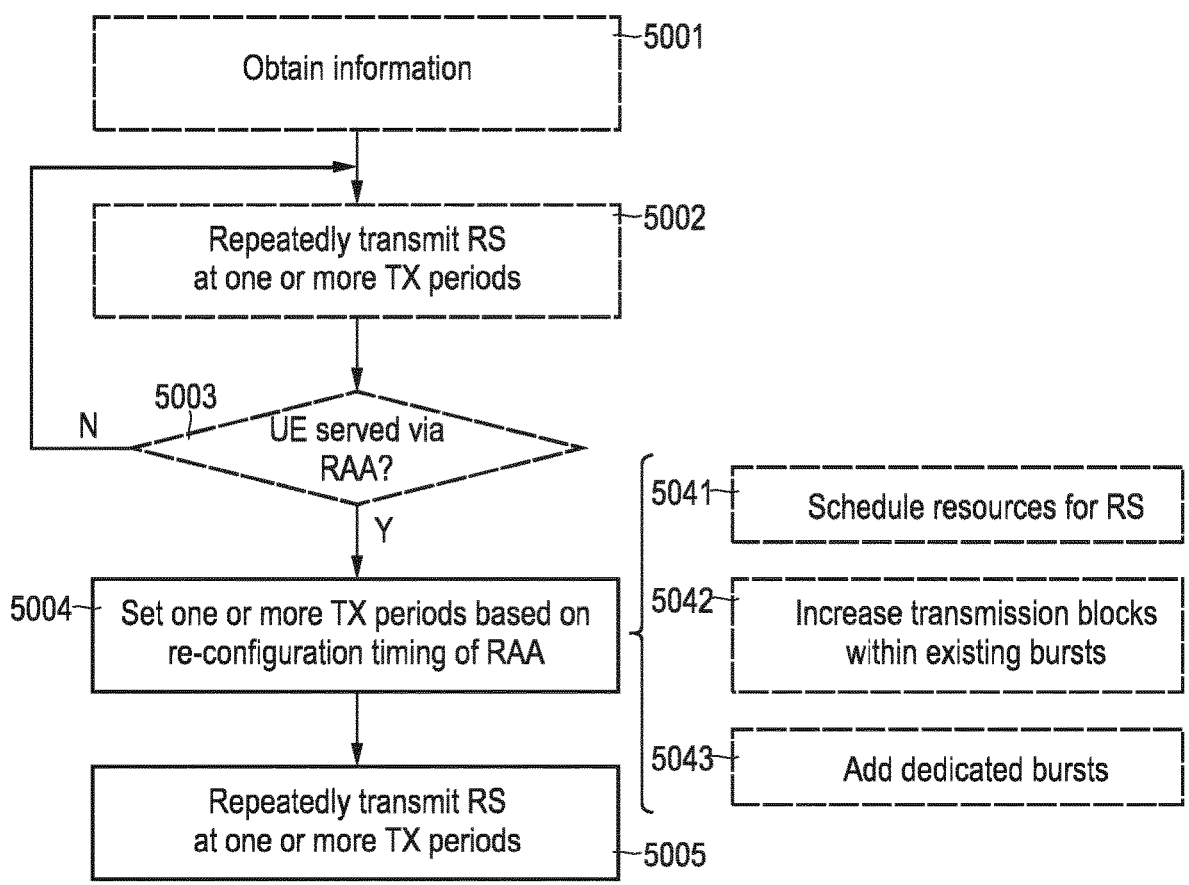
FIG. 9 is a flowchart of a method according to various examples.

FIG. 9 is a flowchart of a method according to various examples. For example, the method of FIG. 9 may be executed by a transmitter node, e.g., a BS of a RAN of a cellular NW. For instance, the method of FIG. 9 may be executed by the BS 101, e.g., by the processor 1011 upon loading program code from the non-volatile memory 1015. Optional boxes are illustrated with dashed lines in FIG. 9. Hereinafter, for sake of simplicity, the method of FIG. 9 will be explained in the context of an implementation by the BS 101, but, as a general rule, other kinds and types of transmitter node may execute the method of FIG. 9.

FIG. 9 generally relates to strategy A of TAB. 2. The method of FIG. 9 can be implemented for scenario A or B of TAB. 1.

At optional box 5001, the BS 101 obtains information associated with the operation of the RRD 109. For instance, it would be possible that the information is loaded from a non-volatile memory or obtained from a remote repository.

Alternatively or additionally, it would be possible that the respective information is received via the control link 199 from the RRD 109 (cf. FIG. 5; scenario A of TAB. 1). Alternatively or additionally, it would be possible that the respective information is received via a control channel from a UE that is operating the RRD 109, e.g., from the UE 102 (cf. FIG. 6; scenario B of TAB. 1).

Depending on the particular implementation of the method of FIG. 9, the information obtained at box 5001 can include various information elements. For instance, it would be possible that the BS 101 obtains an identity of a given DL TX beam that is directed towards the RRD. For instance, the UE 102 and/or the RRD 109 may report that it is the downlink TX beam 304 that is directed towards the RRD 109 (cf. FIG. 5; cf. FIG. 6).

Alternatively or additionally, the BS 101 may obtain—at box 5001—a message that is indicative of the re-configuration timing 510 of the RRD 109. For instance, the message may indicate the switching periodicity for switching between different spatial filters. Alternatively or additionally, it would be possible that the message is indicative of a count of the spatial filters $N_{RAA}$. The count of spatial filters correlates with the dwell time 511-513 on each spatial filter (cf. FIG. 7).

Alternatively or additionally, the BS 101 may obtain a message that is indicative of one or more requested TX periods of the RSs. For example, thereby, the UE 102 could indicate a preferred requested one or more TX periods.

Alternatively or additionally, the BS 101 may obtain a message that is indicative of at least one UE being served via the RRD 109. For example, in the scenario FIG. 5 or FIG. 6, the UE 102 may indicate to the BS 101 that it is receiving signals from the BS 101 via the RRD 109. Here, it would be possible that such message is indicative of one or more observed RX periods of the RSs at the UE 102. Then, because the one or more observed RX periods differ from the one or more TX periods, the BS 101 can conclude that the UE 102 is served via the RRD 109.

At optional box 5002, the BS 101 repeatedly transmits RSs to the UE 102 using the downlink TX beam 304 directed towards the RRD 109, at one or more TX periods 551-552.

Box 5002 may be in accordance with a default setting for the one or more TX periods 551-552.

Next, at optional box 5003, the BS 101 determines whether at least one of the UE's 102-104 connected to the BS 101 is served via the RRD 109. This can, in particular, be based on information obtained at box 5001.

If it is judged that at least one UE—in the scenario of FIG. 5 in FIG. 6 the UE 102—is served via the RRD, the method commences at box 5004.

At box 5004, the BS 101 sets the one or more TX periods of repeatedly transmitting the RSs which occurs at box 5005. The setting of box 5004 is based on the information obtained on box 5001. This is, in particular, based on the re-configuration timing 510 of the RRD 109.

Setting the one or more TX periods 551-552 can pertain to adjusting the one or more TX periods 551-552, e.g., if the repeated transmission of the RSs 198 has previously commenced at box 5002. Otherwise, setting the one or more TX periods can also pertain to activating the repeated transmission (without any prior repeated transmission). By setting the one or more TX periods 551-552, the change of the one or more RX periods 531 of the RSs 198 at the UE 102 caused by the re-configuration timing 510 is counteracted (cf. FIG. 7).

Setting the one or more TX periods based on the re-configuration timing 510 can, in particular, include scheduling resources for the RSs, box 5041. The scheduling can include transmitting, to the UE 102, a message indicative of the schedule resources.

This could be broadcast message or a unicast message or a point-to-multipoint message. A downlink control channel may be used.

Figure 10:
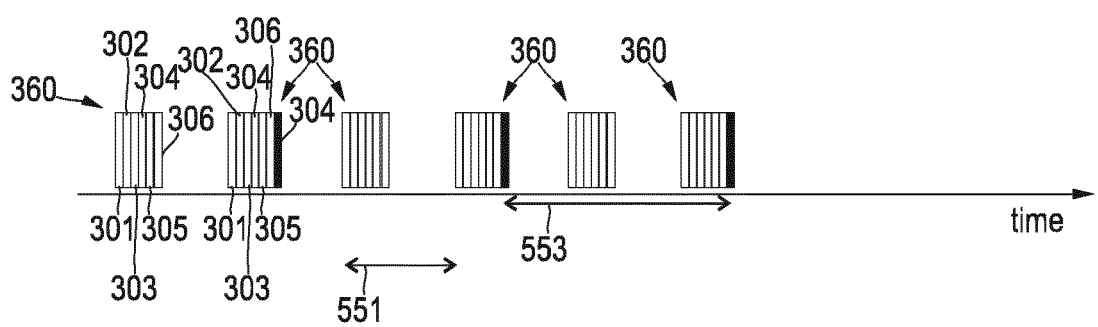
FIG. 10 schematically illustrates setting one or more transmit periods of repeatedly transmitting reference signals according to various examples.

Setting the one or more TX periods based on the re-configuration timing 510 can, furthermore, include increasing a count of respective transmission blocks within a respective burst transmission 360. This is illustrated in FIG. 10. FIG. 10 illustrates burst transmissions 360, each burst transmission 360 including multiple blocks associated with the multiple DL TX beams 301-306. The blocks of a burst transmission 360 are included in adjacent time-frequency resources of a time frequency resource grid, e.g., in a single transmission radio frame or time slot. It would be possible that there is a predefined or even fixed time-domain gap between adjacent blocks of the burst transmission 360, e.g., one or two symbols. There can, alternatively or additionally, be a frequency-domain gap or frequency-domain hopping scheme applied to the blocks of the burst. It would be possible that the blocks of the burst transmission 360 include a reference to the burst. It would be possible that the blocks of the burst transmission 360 include a reference to their position within the burst. It would be possible that the blocks of the burst transmission 360 reference to the total number of blocks of the burst transmission 360.

The burst transmissions 360 are transmitted at a certain periodicity which, thus, defines the TX periodicity 551 for the RSs 198.

As part of setting the one or more TX periods, every second burst transmission is extended by an additional block (filled in dark color in FIG. 10) for an additional repetition of the RS 198 on the DL TX beam 304 directed towards the RRD 109. A further TX period 553 is, thus, defined for the RSs 198 on the DL TX beam 304. Thus, while the TX periods 551, 553 is set for the DL TX beam 304 depending on the re-configuration timing 510, the TX period 551 is set independently of the re-configuration timing 510 for the other downlink TX beams 301-303, 305-306. In other words, the setting of the one or more TX periods 551, 553 is selectively set for the DL TX beam 304 that is directed towards the RRD 109.

From another perspective, additional transmit blocks are added to existing burst transmissions 360: in the scenario of FIG. 10, the one or more TX periods 551, 553 are set for the transmission block of the burst transmission 360 associated with the DL TX beam 304 directed towards the RRD 109. More specifically, the count of this transmit block per repetitive burst transmission 360 is increased from 1 to 1.5.

Figure 11:
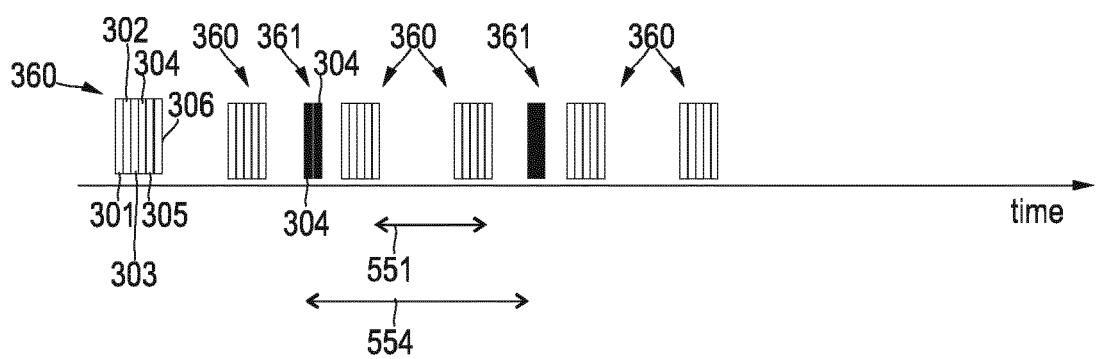
FIG. 11 schematically illustrates one or more transmit periods of repeatedly transmitting reference signals according to various examples.

In other examples, it would also be possible to add additional repetitive burst transmissions, box 5043 of FIG. 9. This is illustrated in FIG. 11. In FIG. 11, the count of repetitive burst transmissions 360 is increased. In FIG. 11, the always-on burst transmissions 360 are complemented by on-demand burst transmissions 361 only including the transmission block associated with the DL TX beam 304 directed towards the RRD 109. The on-demand burst transmissions 361 are activated upon executing box 5043 of FIG. 9. This defines the additional TX period 554 for the RSs 198 transmitted towards the UE 102. Information for the on-demand burst transmissions 361 may be provided as a unicast or multicast or broadcast message, to thereby inform the UE 102.

Figure 12:
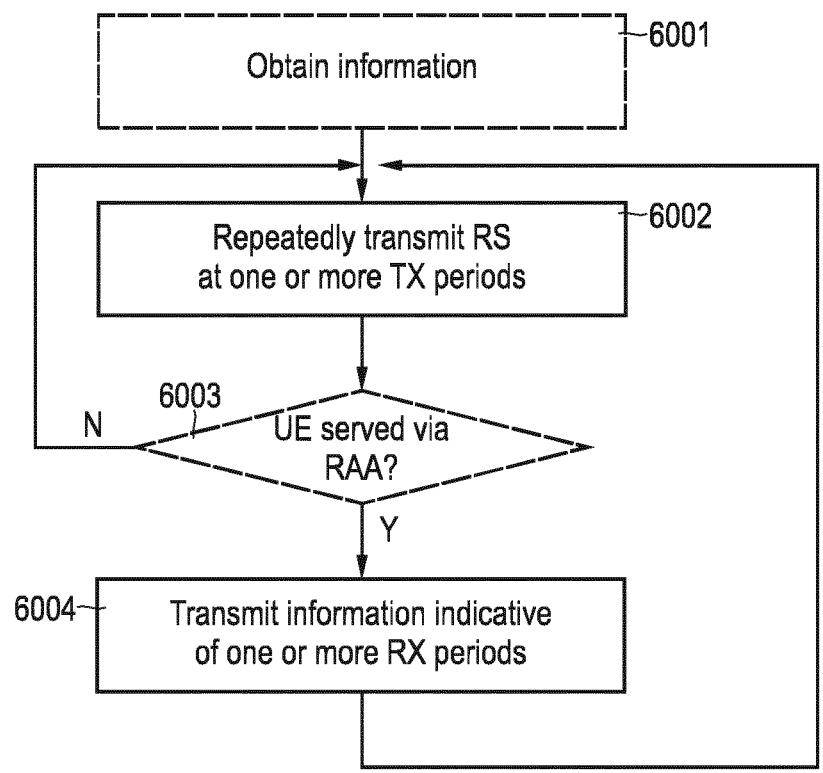
FIG. 12 is a flowchart of a method according to various examples.

FIG. 12 is a flowchart of a method according to various examples. For example, the method of FIG. 12 may be executed by a transmitter node, e.g., a BS of a radio access network of a cellular network. For instance, the method of FIG. 12 may be executed by the BS 101, e.g., by the processor 1011 upon loading program code from the non-volatile memory 1015. Optional boxes are illustrated with dashed lines in FIG. 12. Hereinafter, for sake of simplicity, the method of FIG. 12 will be explained in the context of an implementation by the BS 101, but, as a general rule, other kinds and types of transmitter node is may execute the method of FIG. 12.

FIG. 12 generally relates to strategy B of TAB. 2. The method of FIG. 9 can be implemented for scenario A or B of TAB. 1.

At box 6001, the BS 101 obtains information indicative of a re-configuration timing of the RRD 109, e.g., via the UE 102 and/or the RRD 109 via the control link 199 (cf. TAB. 1, scenarios A and B, respectively). Box 6001 can include loading the information from a local non-volatile memory.

At box 6002, the BS 101 repeatedly transmits RSs 198 at one or more TX periods 551-552.

At box 6003, the BS 101 determines whether at least one UE 102-104 is served via the RRD 109 (in FIG. 5 and FIG. 6: the UE 102). For instance, the BS 101 could determine that the UE 102 served via the RRD 109 based on a measurement report from the UE 102 that is indicative of one or more observed RX periods of the RSs 198 at the UE 102. If the one or more observed RX periods deviate from the one or more TX periods, then this can be an indication that the UE 102 is served via the RRD 109.

In response to determining that the UE 102 is served via the RRD 109, the BS 101 transmits, at box 6004, information indicative of one or more RX periods 531 at the UE 102 to the UE 102. This enables the UE 102 to take this information into account when performing channel sensing based on monitoring for the RSs 198 (cf. TAB. 3).

It would be possible that the UE 102 is informed of the presence of the RRD 109 in the coverage area of the BS 101.

Optionally, the BS 101 can transmit, at box 6004, information indicative of the beam identity of the downlink TX beam 304 that is directed towards the RRD 109. This enables the UE 102 to check, depending on the beam identity encoded into the RSs 198, whether the respective one or more RX periods 531 can be changed due to the re-configuration timing 510 of the RRD 109.

Box 6003 is optional. In some examples, the BS 101 can transmit the information indicative of the one or more RX periods without knowledge of whether the UE 102 is being served via the RRD 109 or not. In such a scenario, the information can be indicative of an expected range for the one or more RX periods at the UE 102. For example, the expected range may cover the one or more RX periods as observed when being served via the RRD 109 and when not being served via the RRD 109.

In some examples, it would be possible that the one or more RX periods 531 are determined as common multiples of the respective transmit periodicity 551 and the cycle periodicity 519 for switching through the multiple spatial filters at the RRD 109, as explained previously in connection with FIG. 7. In other examples, the one or more RX periods can be determined by a time-domain convolution of the one or more TX periods 551-552 with the dwell times 511-513 defined by the re-configuration timing.

Figure 13:
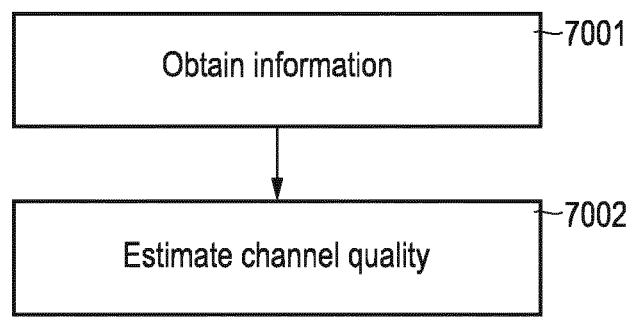
FIG. 13 is a flowchart of a method according to various examples.

FIG. 13 is a flowchart of a method according to various examples. For example, the method of FIG. 13 may be executed by a receiver node, e.g., a UE connectable to a radio access network of a cellular network. For instance, the method of FIG. 13 may be executed by the UE 102, e.g., by the processor 1021 upon loading program code from the non-volatile memory 1025. Hereinafter, for sake of simplicity, the method of FIG. 13 will be explained in the context of an implementation by the UE 102, but, as a general rule, other kinds and types of transmitter node is may execute the method of FIG. 13.

At box 7001, the UE 102 obtains information. For example, the UE 102 can obtain information indicative of the re-configuration timing 510 of the RRD 109 switching between the multiple spatial filters, and can obtain information indicative of the one or more TX periods 551-554 of RSs 198 that are repeatedly transmitted by the BS 101. Then, at box 7002, the UE 102 can estimate the channel quality based on monitoring for the RSs 198 based on one or more RX periods 531 of the RSs 198 which are determined based on the one or more TX periods 551-554 and the re-configuration timing 510, as previously explained in connection with FIG. 7. In such an example, the UE 102 can autonomously determine the one or more RX periods.

In another example, the UE 102 can obtain information indicative of the one or more RX periods 531 directly from the BS 101, at box 7001. The scenario is interrelated with the scenario FIG. 12: box 6004.

Next, practical implementations of the methods of FIGS. 9, 12, and 13 are described for scenario A and B of TAB. 1.

Scenario a (BS-Controlled RRD)

According to example techniques described herein, it is proposed that the BS 101 shares, in addition to the value of the one or more TX periods 551, 552—e.g., a TX periodicity $T_{RS}$—a list of beam identities that may have different one or more RX periods $T^*_{RS}$ (cf. FIG. 12, box 6004). The BS may either indicate a range of the one or more RX periods or indicate the precise values for these one or more RX periods. This information can be signaled in the system information of the BS, i.e., master information block (MIB) or secondary information block (SIB). The reason why it is signaled that the one or more RX periods may be different than the one or more TX periods can be understood by considering the UE 103 in FIG. 5. Although the UE 103 is in the catchment area of the DL TX beam 304 directed towards the RRD 109, the one or more RX periods at the UE 103 are the same as the one or more TX periods at the BS 101—this is because the UE 103 is not served via the RRD 109. But for the UE 102, the one or more RX periods 531 differ from the one or more TX periods 551-554, because the UE 102 is served via the RRD 109. For instance, assuming that the dwell time on each spatial direction 351-353 corresponds to the TX periodicity of, e.g., an SSB $T_{SSB}$, then the RX periodicity is 3 $T_{SSB}$. Note that the BS 101 may allocate more SSBs to the DL TX beam 304, but this may still not be enough to cover all spatial directions 351-353 but just to ensure that the repetition rate is within the specified range (currently 160 ms).

The technical effect of the above is as follows. As discussed earlier, report on the RX periodicity has no bearing on use case 1 of TAB. 2 (initial access). But on use cases 2 and 3 of TAB. 2, it has. Use case 2 (RS for measurement reporting) originates from a request by the BS to the UE to perform measurements on RSs. It is, however, subject to UE implementation how those measurements should be made. More specifically, for Layer 1 PHY-reporting, the UE may measure, e.g., RSs Received Power (RSRP) or signal to interference and noise ratio (SINR) on a certain DL TX beam and report back after a certain maximum time. It is, however, up to the UE to choose how to calculate the reported value. The most common way would be to make measurements during several repetitive transmissions of the RSs, and then computing the average. If the TX periodicity of the RSs is not what the UE believes it is, such average computation fails, as it would underestimate the real value by a factor "1/number-of-RRD-spatial-filters". It is reasonable that a UE that observes that the DL TX beam 304 (cf. FIG. 5) is sometimes strong (i.e., for the spatial direction 352), but most of the time weak (for the spatial directions 351, 353), would report this as an outage event—the UE 102 can simply not use such beam. If the UE 102, on the other hand, is informed about the possibility that the RX periodicity of the RSs may be an integer multiple of TX periodicity, then the UE 102 can report the RSRP value computed for the relevant repetitions only. The same arguments apply verbatim to use case 3 of TAB. 3 (RS for beam refinement).

A further embodiment is that the BS 101 determines that the UE 102 is in fact served via the RRD 109. In this case, the BS 101 may signal to this UE 102 the exact RX periodicity that applies for the beam 304—i.e., not only a range of possible RX periodicities (cf. FIG. 12: box 6004).

The technical effect of this is that there is no uncertainty for the UE 102 what the RX periodicity is.

An alternative embodiment to address the mobility problem use cases 2 and 3 of TAB. 2 would be that the BS 101 allocates the RSs more often to the DL TX beam 304 directed towards the RRD 109 via which the UE 102 is served. I.e., the one or more TX periods of the RSs may be set based on a re-configuration timing of the RRD 109 (cf. FIG. 9: box 5004). This would be transparent to the UE 102, but the one or more RX periods may be different compared to the one or more RX periods during initial access (at which time the BS 101 does not yet have knowledge of the UE 102). For this to be meaningful, means for the BS 101 to determine that the UE 102 is in fact served via the RRD 109 (i.e., to tell the UE 103 apart from the UE 102, cf. FIG. 5) must be available. It is therefore proposed that the BS 101 can request the UE 102 and the UE 103 to estimate the one or more RX periods of RSs, and report back to the BS 101 the observed RX periods (cf. FIG. 9: box 5001). Alternatively or additionally, the UEs can be asked to report back the one or more measurements—e.g., received signal strength or signal-to-interference-and noise or other indicators of the channel quality—used to estimate the one or more RX periods of the RSs: If there is a timed dependency in such indicator of the channel quality, this can be an indication of the UE being served via the RRD 109. A possible variant is that the BS 101 provides the number of spatial filters $N_{RAA}$ to the UE 102 and the UE 103. The UEs 102-103, which are already informed that the one or more RX periods may be different from the one or more TX periods, measure the rate at which the strongest signal level appears in the repetitive transmission. If the rate corresponds to the one or more TX periods, then BS 101 determines that the UE 103 is not served via the RRD 109, while if it is in agreement with the number of spatial filters of the RRD 109, it is the UE 102 being served via the RRD 109. If the reported value is not agreeing with neither, the BS 101 may still determine that the respective UE is served via the RRD 109, since it is plausible that there are multiple high-quality RRD spatial filters to reach the UE.

Scenarios described above may pertain to SSB bursts (cf. burst transmissions 360 described above) that include multiple SSB blocks each block being associated with a respective DL TX beam of the BS 101. Alternatively or additionally, scenarios described above can relate to RSs transmitted during connected mode and dedicated to a respective UE, e.g., UE 102 being served via the RRD 109. An example would be CSI-RSs that are each on different symbols, to enhance use case 2 and use case 3 of TAB. 3 for the UE 102 operating in the connected mode. The setting of respective one or more TX periods based on the re-configuration timing of the RRD can be informed over a control channel between the BS 101 and the UE 102. For example, the Physical Downlink Control Channel (PDCCH) can be used. The advantage is that a CSI-RS may require a single symbol while an SSB requires four.

Scenario B (UE-Controlled RRD)

It is proposed that the UE 102 can request additional resources for RSs—e.g., for use case 2 of TAB. 3, beam management—when being served via the RRD 109. Then, the BS 101 can set the one or more TX periods of the RSs accordingly (cf. FIG. 9: box 5004). The UE request can include the following information:

TABLE 5

Information provided by the UE 102 to the BS 101, e.g., via a control channel.

| Information element | Brief description | Details |
|---|---|---|
| A | Information indicative of recon figuration timing | Information indicative of the re-configuration timing can be provided explicitly, e.g., by specifying the periodicity of switching between different spatial filters or by specifying the dwell time. It would also be possible that the information indicative of the re-configuration timing is provided implicitly, e.g., by specifying the count of spatial filters NRRD, i.e., the count of directions into which incoming signals can be reflected. Then, it can be assumed that the dwell time is the same for all spatial filters. NRRD may be obtained by the UE 102 from the RRD 109 via the control link 199 (cf. FIG. 6). |
| B | Cause value | The UE 102 may specify the reason for the need to perform the request, e.g., beam management with an intervening RRD 109. Thereby, the BS 101 is made aware of the presence of a RRD 101 in the vicinity of the UE 102. |
| C | Identity of RRD | The UE 102 may inform the BS 101 of the identity of the RRD 109. The BS 101 may make use of this information for future connections of UEs located nearby and also served by the same RRD109. |
| D | Request for exclusive RSs | The UE might request exclusive BS pilot signals, meaning that the BS shall not assume that the allocated BS pilot signal are available for use by other UEs. This feature is relevant in the case where several UEs are serviced by the same RRD, but only one of them can control the RRD at any given time. The BS 101 might also make use of the RRD ID in information C to determine whether exclusivity is needed. |

The technical effect of the UE 102 providing information as described in TAB. 5 is that the UE 102 can make use of all the requested measurement occasions, thereby avoiding a reduction of the UE mobility as well as degradation of link quality reports. Degraded link quality reports might potentially lead to radio link failure. As has been explained earlier, a request for RSs is needed due to the fact that the RRD 109 is able to reflect signals in only one spatial direction 351-353 at a time.

Beam management based on channel sensing according to use case 2 of TAB. 3 can, as a general rule, rely on measurements of broadcasted RSs—e.g. PSSs or SSSs—, as and/or dedicated RSs—e.g., CSI-RSs. For example, for PSSs and/or SSSs, the UE 102, after having reached the connected mode, requests from the BS 101 additional SSB resources, in the connected mode, in order to perform proper beam management. As before, the additional SSBs should be separated in time. Several ways of implementing this embodiment can be devised:

TABLE 6

Scenario for setting one or more TX periods of SSB blocks

| Scenario | Brief Description | Details |
|---|---|---|
| 1 | Additional SSB(s) within SSB burst (cf. FIG. 10) | Within the regular SSB burst, some SSBs are "always on", thereby available for initial access at any time, while some other SSBs are spared and only activated on-demand, i.e., upon requests from the UEs. For example, up to 64 SSB may be potentially allowed in 3GPP 5G NR, of which 16 could be configured as always-on and 48 as spare. However, this approach has the drawback that in highly loaded NWs the available SSBs might be used up and the NW might not be able to satisfy all UE requests. Furthermore, for a RRD, all SSBs shall have the same spatial filtering (as seen from the BS). This would require a large set of overhead, which would reduce system capacity. It is also not desired from UE current consumption perspective to request all UEs to listen for more SSBs than needed. The existence of additional on-demand SSBs may only be revealed in the DL TX beam they represent, i.e., the DL TX beam directed towards the RRD. For example, respective information may be broadcasted in information blocks on the DL TX beam directed towards the RRD. |
| 2 | Additional SSB bursts (cf. FIG. 11) | An additional SSB burst can be activated on-demand. SSBs in the additional SSB burst (burst transmissions 361 in FIG. 11) are activated on-demand, i.e., upon requests from the UEs and have the same spatial filtering as seen from the BS 101, i.e., use the DL TX beam also used for the respective SSBs in an always-on SSB burst. Access to the parameters defining the additional SSB burst (frequency and time location, number of SS blocks, repetition period, and so on) are, e.g., broadcasted in the system information. The original always-on SSB bursts (burst transmissions 360 in FIG. 11) are kept unchanged and are still available for initial access and for measurements by UEs not being served via the RRD (cf. FIG. 6: UEs 103-104). The additional SSB bursts may be multiplexed with user data in other beams as seen from the BSs. |

The technical effect is the same as above, that is, the ability of the UE 102, despite the intervening RRD 109, to perform proper measurements for beam management with unconstrained mobility. Furthermore, the additional SSBs might be beneficial to other UEs in the same area, also for initial access (Tab. 2: use case 1).

Summarizing, at least the following techniques have been described above:

Features relating to the deployment scenario A of TAB. 1:

A BS should signal RX periodicities per DL TX beam (BS beam or RRD spatial filter) whenever these may differ from the standard TX periodicity. In response, the UE should take this information into account whenever measuring and reporting RS RX strengths, e.g., on request by the BS.

If the BS determines that a UE is served by a RRD, then the BS signals the exact value of the transmit periodicity that applies for this UE on a particular spatial filter of the RRD. A technical effect of this is that whenever the BS determines that a UE is communicating via the RRD, it can avoid the uncertainty that is inherent in above feature.

The BS should request the UE to measure and report its observed RX periodicity. The technical effect is to allow the BS to make the decision needed to determine whether a UE is served by a RRD.

Additionally, the BS may configure dedicated CSI-RS for re-configuration management at the RRD (possibly transparent in specification). From an implementation perspective, such CSI-RS needs to be associated with spatial filters of the RRD. Features related to the deployment scenario B of TAB. 1:

A signaling, from the UE to the BS, requesting a TX periodicity of RSs for beam management in connected mode. The request could specify a certain number of repetitions of the RSs to compensate for the fact that the RRD has a certain count of spatial filters. The requested added RSs should be separated in time.

Further, the UE can also request repetitions of a certain SSB within the SSB burst. Repetitions of the SSB need to be separated in time. The repetition rate should be sufficient to compensate for the increased beam management overhead incurred by the count of spatial filters (or a subset thereof) of the RRD.

Further, the UE can also request additional SSBs, associated (i.e., repetitions) with a certain SSB in the regular SSB burst. The requested additional SSBs are part of an additional (RRD-dedicated) SSB burst, whose properties are broadcasted in the system information of the cell. Repetitions of the SSB need to be separated in time. The repetition rate should be sufficient to compensate for the increased beam management overhead incurred by the count of spatial filters (or a subset thereof) of the RRD.

The signaling might also indicate that the reason/cause for the request is the presence of an intervening RRD affecting beam management. The number of spatial filters of the RRD (or a subset) and a RRD identifier may also be reported. If the request is not satisfied by the BS, the effect is a reduced support of UE mobility (by a factor proportional to the count of spatial filters) as well as a degradation of link quality reports by the UE, potentially leading to radio link failure.

In the case of UE controlled RRD beam management: The signaling might also include an exclusivity flag, meaning that the BS is prohibited from allocating the requested RS resources to other UEs concurrently. This feature is relevant in the case where several UEs are serviced by the same RRD, but only one of them can control the RRD at any given time, or when the maximum number of supported simultaneous UEs that can be served by the RRD is reached.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, while various scenarios have been illustrated in the context of a DL transmission from a BS 101 to a UE 102 using the RRD 109, similar techniques can be applied for, e.g., transmissions between two mobile devices, e.g., to UEs on a sidelink or generally using device-to-device (D2D) communication. In particular for scenarios in which the transmitter node moves relatively with respect to the RRD, the spatial direction into which incident signals are selectively reflected by the RRD depends on the respective spatial filter provided by the RRD, but also depends on the spatial direction with which the incident signals arrive at the RRD (wherein this direction depends on the relative movement of the transmitter node with respect to the RRD).

For further illustration, above, various scenarios have been described in which the spatial filter provided by the RRD is associated with a respective spatial direction into which the incident signals are reflected. It is, as a general rule, possible, that the spatial filter is designed to provide a reflection into a single spatial direction or multiple spatial directions.

For further illustration, well above various scenarios have been described with an implementation of the RRD using an antenna array, similar techniques may be readily applied to other kinds and types of surfaces having a re-configurable refractive index.

The invention claimed is:

1. A method of operating a transmitter node configured to communicate with one or more receiver nodes using a re-configurable reflective device (RRD), the RRD being re-configurable to provide multiple spatial filters, each one of the multiple spatial filters being associated with a respective spatial direction into which incident signals are selectively reflected by the RRD, the method comprising:
repeatedly transmitting reference signals towards the RRD at one or more transmit periods, and
setting the one or more transmit periods based on a re-configuration timing of the RRD, the re-configuration timing defining a dwell time of the RRD for providing each one of the multiple spatial filters, to thereby counteract a change of one or more receive periods of the reference signals at at least one receiver node of the one or more receiver nodes caused by the re-configuration timing.

2. The method of claim 1,
wherein the reference signals are repeatedly transmitted by the transmitter node using multiple transmit beams, wherein a first transmit beam of the multiple transmit beams is directed towards the RRD, wherein a second transmit beam of the multiple transmit beams is not directed towards the RRD,
wherein for the first transmit beam the one or more transmit periods are set based on the re-configuration timing,
wherein for the second transmit beam the one or more transmit periods are set independently of the re-configuration timing.

3. The method of claim 1,
wherein one or more repetitive burst transmissions comprising multiple transmission blocks associated with multiple transmit beams are used by the transmitter node for said repeatedly transmitting of the reference signals, each one of the multiple transmission blocks comprising at least one of the reference signals,
wherein the one or more transmit periods are set based on the re-configuration timing for a given transmission block of the multiple transmission blocks that is associated with a given transmit beam of the multiple transmit beams that is directed towards the RRD.

4. The method of claim 3, wherein the one or more transmit periods are set for the given transmission block by setting a count of the given transmission block per repetitive burst transmission.

5. The method of claim 3, wherein the one or more transmit periods are set for the given transmission block by setting a count of the one or more repetitive burst transmissions.

6. The method of claim 5, wherein the one or more transmit periods are set for the given transmission block by activating at least one on-demand repetitive burst transmission of the one or more repetitive burst transmissions.

7. The method of claim 6, further comprising:
providing a unicast or multicast or broadcast message to at least one receiver node of the one or more receiver nodes, the message comprising configuration information for the at least one on-demand repetitive burst transmission.

8. The method of claim 3, further comprising:
obtaining, from at least one of the RRD or at least one receiver node of the one or more receiver nodes, an identity of the given transmit beam directed towards the RRD.

9. The method of claim 1, further comprising:
obtaining, from at least one of the RRD or at least one receiver node of the one or more receiver nodes, a message indicative of the re-configuration timing.

10. The method of claim 9, wherein the message is indicative of count of the spatial filters.

11. The method of claim 1, further comprising:
obtaining, from at least one receiver node of the one or more receiver nodes, a message indicative of one or more requested transmit periods of the reference signal,
wherein the one or more transmit periods set further depending on the one or more requested transmit periods.

12. The method of claim 1, further comprising:
obtaining, from at least one receiver node of the one or more receiver nodes, a message indicative of the at least one receiver node being served via the RRD,
wherein the one or more transmit periods are set in response to receiving the message indicative of the at least one receiver node being served via the RRD.

13. The method of claim 12, wherein the message indicative of the at least one receiver node being served via the RRD is indicative of one or more observed receive periods of the reference signals at the at least one receiver node.

14. A method of operating a transmitter node configured to communicate with one or more receiver nodes using a re-configurable reflective device (RRD), the RRD being re-configurable to provide multiple spatial filters, each one of the multiple spatial filters being associated with a respective spatial direction into which incident signals are selectively reflected by the RRD, the method comprising:
repeatedly transmitting reference signals towards the RRD at one or more transmit periods;
obtaining information indicative of a re-configuration timing of the RRD for switching between the multiple spatial filters, the re-configuration timing defining a dwell time of the RRD for providing each one of the multiple spatial filters; and
providing information indicative of one or more receive periods of the reference signals to at least one receiver node of the one or more receiver nodes, the one or more receive periods depending on the one or more transmit periods and the re-configuration timing.

15. The method of claim 14, wherein the information is indicative of an expected range for the one or more receive periods at the at least one receiver node.

16. The method of claim 14,
wherein the reference signals are transmitted towards the RRD using a given transmit beam,
wherein the information is indicative of a beam identity of the given transmit beam.

17. The method of claim 14, further comprising:
determining that the at least one receiver node is served via the RRD,
wherein the information is provided in response to determining that the at least one receiver node is served via the RRD.

18. The method of claim 17, further comprising:
obtaining, from the at least one receiver node, a measurement report of one or more observed receive periods of the reference signals at the at least one receiver node,
wherein said determining that the at least one receiver node is served via the RRD depends on the measurement report.

19. The method of claim 14, wherein the one or more receive periods are determined as common multiples of at least one transmit periodicity defined by the one or more transmit periods and a cycle periodicity for switching through the multiple spatial filters in accordance with the re-configuration timing.

* * * * *